United States Patent [19]

Lowery

[11] Patent Number: 5,159,703
[45] Date of Patent: Oct. 27, 1992

[54] SILENT SUBLIMINAL PRESENTATION SYSTEM

[76] Inventor: Oliver M. Lowery, 5188 Falconwood Ct., Norcross, Ga. 30071

[21] Appl. No.: 458,339

[22] Filed: Dec. 28, 1989

[51] Int. Cl.⁵ .................. H04B 7/00; H04R 25/00; H04R 3/02
[52] U.S. Cl. .................................. 455/42; 455/46; 455/66; 381/73.1; 128/420.5
[58] Field of Search .............. 455/46, 47, 66, 109, 455/110, 42–43; 381/73.1, 105, 124; 358/141–143; 600/28; 128/420.5; 380/38

[56] References Cited

U.S. PATENT DOCUMENTS

| | | | |
|---|---|---|---|
| 3,060,795 | 10/1962 | Corrigan et al. | 352/131 |
| 3,278,676 | 10/1966 | Becker | 358/142 |
| 3,393,279 | 7/1968 | Flanagan | 128/420.5 |
| 3,712,292 | 1/1973 | Zentmeyer, Jr. | 600/28 |
| 4,141,344 | 2/1979 | Barbara | 600/28 |
| 4,395,600 | 7/1983 | Lundy et al. | 381/73.1 |
| 4,463,392 | 7/1984 | Fischer et al. | 360/30 |
| 4,777,529 | 10/1988 | Schultz et al. | 381/73.1 |
| 4,834,701 | 5/1989 | Masaki | 600/28 |
| 4,877,027 | 10/1989 | Brunkan | 128/420.5 |

Primary Examiner—Reinhard J. Eisenzopf
Assistant Examiner—Andrew Faile

[57] ABSTRACT

A silent communications system in which nonaural carriers, in the very low or very high audio frequency range or in the adjacent ultrasonic frequency spectrum, are amplitude or frequency modulated with the desired intelligence and propagated acoustically or vibrationally, for inducement into the brain, typically through the use of loudspeakers, earphones or piezoelectric transducers. The modulated carriers may be transmitted directly in real time or may be conveniently recorded and stored on mechanical, magnetic or optical media for delayed or repeated transmission to the listener.

3 Claims, 3 Drawing Sheets

SILENT SUBLIMINAL PRESENTATION SYSTEM

BACKGROUND—FIELD OF THE INVENTION

This invention relates in general to electronic audio signal processing and, in particular, to subliminal presentation techniques.

BACKGROUND—DESCRIPTION OF PRIOR ART

Subliminal learning enjoys wide use today and subliminal tapes are being manufactured by a number of companies in the United States alone. Several decades of scientific study indicate that subliminal messages can influence a human's attitudes and behavior. Subliminal, in these discussions, can be defined as "below the threshold of audibility to the conscious mind." To be effective however, the subliminally transmitted information (called affirmations by those in the profession) must be presented to the listener's ear in such a fashion that they can be perceived and "decoded" by the listener's subconscious mind. We are referring to audio information in this discussion, however, information could be inputted into the subject's subconscious mind through any of the body's sensors, such as touch, smell, sight or hearing. As an example, early development work in the subliminal field utilized motion pictures and slide projections as the medium. Early research into visual and auditory subliminal stimulation effects is exemplified by U.S. Pat. Nos. 3,060,795 of Corrigan, et al. and 3,278,676 of Becker. U.S. Pat. No. 4,395,600 of Lundy and Tyler is representative of later developments in today's subliminal message techniques.

The majority of the audio subliminal tapes available today are prepared using one basic technique. That is, the verbal affirmations are mixed with, and recorded at a lower level than, a "foreground" of music or sounds of ocean surf or a bubbling mountain brook or other similar "masking" sounds. The affirmations are generally recorded 5 decibels (db) or so below the "foreground" programming and regenerative automatic gain control is usually applied to permit the affirmations to change their recorded amplitude in direct proportion to the short term averaged amplitude of the continually varying "foreground" material. In other words, the volume of the affirmations will follow or track the volume changes of the "foreground" programming, but at a lower volume level. Circuit provisions are also usually included to "gate" the affirmations off when the music amplitude is low or zero. This insures that the affirmations cannot be heard during quiet program periods. Thus, today's subliminal affirmations can be characterized as being "masked" by music or other sounds, of constantly changing amplitude and of being reduced or cut off entirely during periods of low or quiet "foreground" programming.

One of the principal, and most widely objected to, deficiencies in available subliminal tape presentation techniques is that the presence of the "foreground" material is intrusive to both the listener and to anyone else in the immediate area. No matter what "foreground" material is chosen, the fact remains that this material can be heard by anyone within its range and presents a definite distraction to other activities such as conversation, thought, desire to listen to other programming such as radio or television, need to concentrate, etc. Additionally, and because the tapes are used repeatedly by the same listener, any "foreground" music or material eventually becomes monotonously tiring to that listener.

It is the purpose of the following described invention to eliminate or greatly reduce all of the above deficiencies. Although its application to the magnetic tape medium is described in the following discussion, the technique is equally applicable to most other desired transmission mediums, such as Compact Disc, videocassettes, digital tape recorders, Public Address (PA) systems, background music installations, computer software programs, random access memory (RAM), read only memory (ROM), "live", real time applications and other mediums now in existence or to be developed in the future.

Implemented on tape cassettes, for example, the subliminal presentation described here is inaudible i.e., high audio or ultrasonic frequencies, the affirmations are presented at a constant, high amplitude level, and they occupy their own "clear channel", non-masked frequency allocations. If desired, the previously described "foreground" music or other material can be added to the tape through use of an audio mixer. The "silent" recordings are inaudible to the user or by others present and are therefore very effective for use during periods of sleep or when in the presence of others. Additionally, the basic requirements of subliminal stimulation are met. That is, the affirmations are efficiently transmitted to the ear and, while undetected by the conscious mind, are perceived by and efficiently decoded by the subconscious mind.

OBJECTS OF THE INVENTION

Accordingly, several objects and advantages of my invention are:

(a) to provide a technique for producing a subliminal presentation which is inaudible to the listeners(s), yet is perceived and demodulated (decoded) by the ear for use by the subconscious mind.

(b) to provide a technique for transmitting inaudible subliminal information to the listener(s) at a constant, high level of signal strength and on a clear band of frequencies.

(c) to provide a technique for producing inaudible subliminal presentations to which music or other "foreground" programming may be added, if desired.

Still further objects and advantages will become apparent from a consideration of the ensuing description and drawings.

BRIEF DESCRIPTION OF THE DRAWINGS

In the drawings, the first digit of each component number also refers to the figure number where that component can be located.

---

Figure 1:
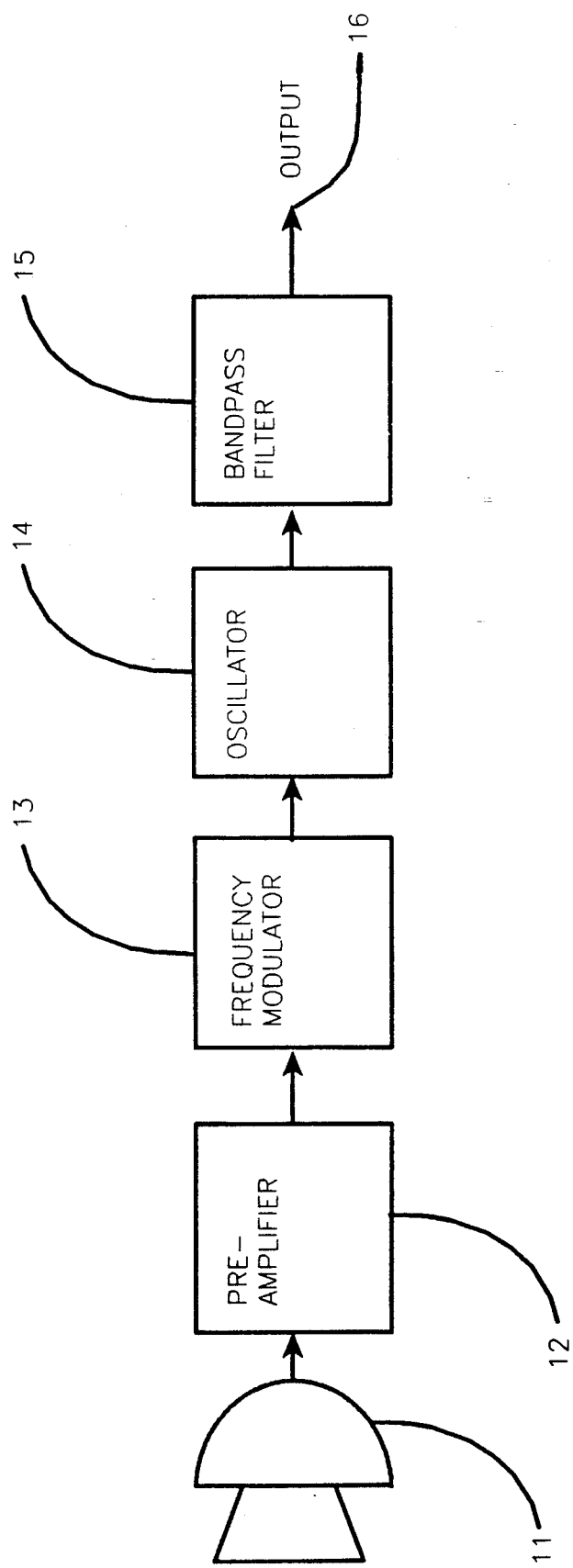
FIG. 1 represents the block diagram of a suitable system which will generate a frequency modulated (FM) signal at 14,500 Hz.

REFERENCE NUMERALS IN DRAWINGS 11 microphone or other      14 low distortion

-continued

REFERENCE NUMERALS IN DRAWINGS

| | |
|---|---|
| audio input signal | audio oscillator |
| 12 audio preamplifier if required | 15 high pass or band pass audio filter |
| 13 frequency modulation circuit | 16 output to tape recorder or other device |
| 21 point on low freq end response curve | 25 midpoint on curve between points 23 and 24 |
| 22 point on low freq end of ear response curve | 26 speaker output of FIG. 1 to ear |
| 23 point on high freq end of ear response curve | 27 demodulated subliminal audio inputted to ear |
| 24 point on high freq end of ear response curve | 31 microphone |
| 32 speech amplifier | 33 balanced modulator |
| 34 carrier oscillator (455 KHz) | 35 filter |
| 36 mixer | 37 heterodyne oscillator (469.5 KHz) |
| 38 bandpass filter | 39 output signal |

DETAILED DESCRIPTION OF A PREFERRED EMBODIMENT

Figure 2:
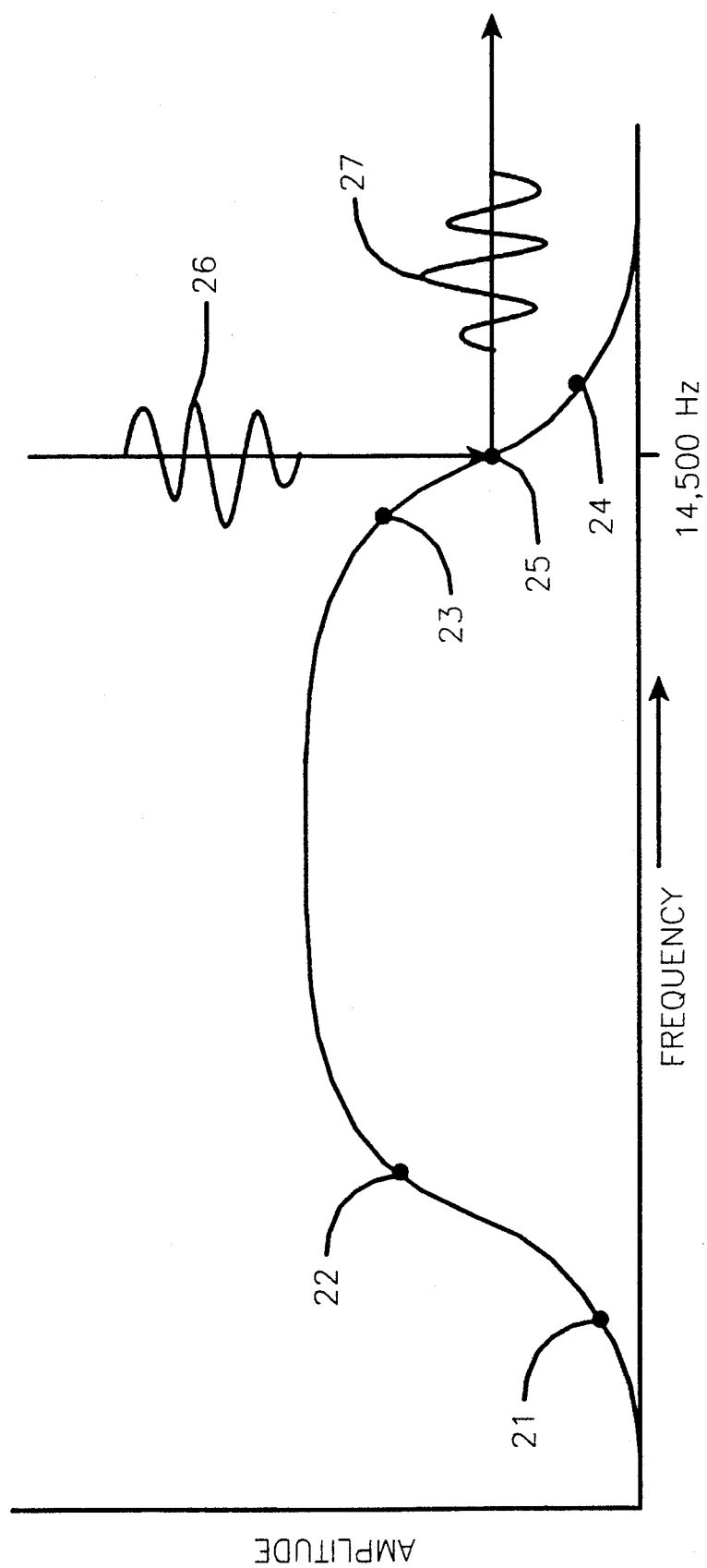
FIG. 2 represents an approximation of the frequency response curve of the human ear and the signal decoding process.

Please refer now to FIG. 1 and FIG. 2, which are drawings of a preferred implementation of the invention.

The principle of operation of the silent subliminal presentation system is as follows:

An audio signal in the upper frequency region of the audio spectrum (for example, 14,500 Hz) is modulated with the desired information. The type of modulation may be any type suitable for subliminal applications; frequency modulation (FM), phase modulation (PM), upper single sideband with suppressed carrier, amplitude modulation (AM), tone modulation, etc.

For broadest application, the high audio frequency selected as the carrier frequency must meet two basic criteria:

(1) be high enough in the audio spectrum that its presence to the human ear is essentially unnoticed or undetectable (without the listener being informed that the signal is actually present) and, (2) be low enough in the audio spectrum that it (and its modulation content) can produce a useful output power from home entertainment type cassette or reel-to-reel magnetic recorders.

This would also include, of course, small portable and automobile tape decks.

Alternatively, the output of the system can be fed directly into an audio amplifier and its speaker/earphone system, Public Address system, etc.

FIG. 1 provides the block diagram of an example of a system capable of generating the desired silent frequency modulated carrier.

The modulation information is inputted into the microphone 11. Other suitable input devices may be substituted for microphone 11, such as a tape recorder or a radio. The microphone 11 is connected to the preamplifier 12 and should have provisions for adjusting its gain in order that the optimum modulation index can be set in the frequency modulator 13. The frequency modulator 13 modulates the frequency of oscillator 14 which has been adjusted for an output of 14,500 Hz as described above. The output of oscillator 14 is fed through a suitable bandpass filter 15 into the tape recorder or directly into a suitable amplifier/speaker system. It is the purpose of the bandpass filter to remove or attenuate audible products of the modulation process in order to maintain as audibly silent an output as practical.

On the receiving end, FIG. 2 represents an approximate and idealized frequency response curve of the human ear. The frequency modulated carrier (centered at 14,500 Hz), as generated above and played through a tape recorder or amplifier/speaker system, is shown on FIG. 2 as speaker output 26, impinging upon the upper slope of the ear's response curve at point 25. The frequency modulated excursions of the speaker output 26 swing between points 23 and 24 on the ear's upper response curve. Because the response curve between points 23 and 25 is relatively linear, this action results in a relatively linear demodulation of the original modulation intelligence, which is passed on subliminally to the inner ear. The amplitude of the demodulated output is not high enough to be detected by the conscious mind but is sufficient in amplitude to be detected by the subconscious mind. In the field of communications engineering design, the above demodulation process in known as slope detection and was used in early FM receiver design. In those receivers, the response curve was formed by the action of a tuned (inductive/capacitance) circuit. In our case, the response curve is formed by the natural response curve of the human ear. The same slope detection technique can be performed at the low frequency end of the human ear response curve. This region is indicated on FIG. 2 as between points 21 and 22. This region, however, has a much smaller available bandwidth and is therefore more restricted as to the amount of information that can be transmitted in an inaudible manner.

In practice, the listener adjusts the volume control of the tape recorder or amplifier to a level just below that at which the listener hears an audible sound or noise from the speaker of the tape recorder. If the recording process is properly done, a spectrum analyzer or a calibrated sound level meter will reveal a strong signal emanating from the tape recorder speaker. A calibrated sound level meter, at a distance of 1 meter (with C weighting and referenced to the standard of 0.0002 micro bar) will typically indicate a silent power output of from 60 to 70 decibels. This is equivalent to the audio power of a loud conversation, yet, in the described system, is inaudible or unnoticed by the listener.

Figure 3:
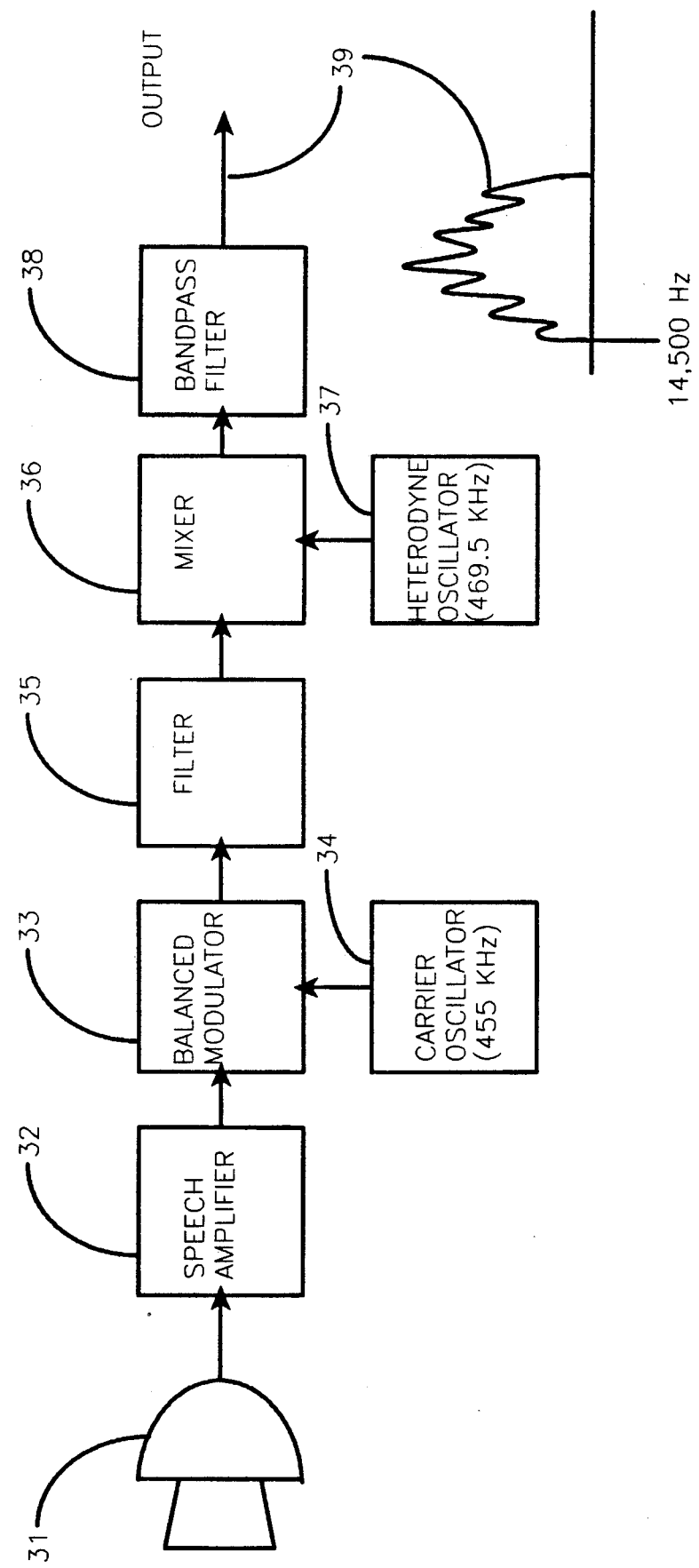
FIG. 3 represents the block diagram of a suitable system which will generate a single sideband, suppressed carrier, amplitude modulated (AM) signal at 14,500 Hz.

FIG. 3 illustrates a system which generates a suitable amplitude modulated (AM) signal, instead of the frequency modulated (FM) system described above. The output is a modulated, single sideband (SSB), suppressed carrier (AM) signal at 14,500 Hz.

The block diagram represents a common scheme for generating an SSB signal and will be briefly described.

The desired subliminal information is spoken into microphone 31. This signal is amplified by speech amplifier 32 and injected into one port of balanced modulator 33. A continuous wave signal of 455 KHz is generated by carrier oscillator 34 and is injected into the second port of balanced modulator 33. The output of balanced modulator 33 is a double sideband, suppressed carrier signal at 455 KHz. This signal is fed through filter 35, causing one of the two sidebands to be removed. This signal is fed into one port of mixer 36. A continuous wave signal at a frequency of 469.5 KHz from hetrodyne oscillator 37 is fed into the other port of mixer 36, resulting in an output of the original subliminal audio information but translated 14,500 Hz higher in frequency. The bandpass filter 38 attenuates signals and noise outside of the frequencies of interest. The amplitude modulated audio output signal is shown as output 39.

Thus, as stated earlier, my invention provides a new system for subliminal presentations which is:
(a) silent,
(b) outputs a constant, high level modulated signal and,
(c) occupies a band of clear channel frequencies.

The foregoing description of the preferred embodiment of the invention has been presented for the purposes of illustration and description. It is not intended to be exhaustive or to limit the invention to the precise form disclosed. Many modifications and variations are possible in light of the above discussions. It is intended that the scope of the invention be limited not only by this detailed description, but rather by the claims appended hereto.

What is claimed:
1. A silent communications system, comprising:
(a) amplitude modulated carrier means for generating signals located in non-aural portions of the audio and in the lower portion of the ultrasonic frequency spectrum said signals modulated with information to be perceived by a listener's brain and,
(b) acoustic and ultrasonic transducer means for propagating said signals, for inducement into the brain, of the listener, and,
(c) recording means for storing said modulated signals on mechanical, magnetic and optical media for delayed or repeated transmissions to the listener.
2. A silent communications system, comprising:
(a) frequency modulated carrier means for generating signals located in non-aural portions of the audio and in the lower portion of the ultrasonic frequency spectrum, said signals modulated with information to be perceived by a listener's brain, and;
(b) acoustic and ultrasonic transducer means for propagating said signals, for inducement into the brain of the listener, and;
(c) recording means for storing said modulated signals on mechanical, magnetic and optical media for delayed or repeated transmissions to the listener.
3. A silent communications system, comprising:
(a) a combination of amplitude and frequency modulated carrier means for generating signals located in non-aural portions of the audio and in the lower portion of the ultrasonic frequency spectrum, said signals modulated with information to be perceived by a listener's brain, and
(b) acoustic and ultrasonic transducer means for propagating said signals, for inducement into the brain of the listener;
(c) recording means for storing said modulated signals on mechanical, magnetic and optical media for delayed or repeated transmissions to the listener.

* * * * *